United States Patent
Cai et al.

(10) Patent No.: US 9,990,753 B1
(45) Date of Patent: Jun. 5, 2018

(54) IMAGE STITCHING

(71) Applicant: Macau University of Science and Technology, Macau (CN)

(72) Inventors: Zhanchuan Cai, Macau (CN); Zhi Li, Macau (CN)

(73) Assignee: Macau University of Science and Technology, Macau (CN)

( * ) Notice: Subject to any disclaimer, the term of this patent is extended or adjusted under 35 U.S.C. 154(b) by 0 days. days.

(21) Appl. No.: 15/404,185

(22) Filed: Jan. 11, 2017

(51) Int. Cl.
| | |
|---|---|
| *G06K 9/36* | (2006.01) |
| *G06T 11/60* | (2006.01) |
| *G06K 9/46* | (2006.01) |
| *G06T 7/11* | (2017.01) |
| *G06T 7/136* | (2017.01) |
| *G06T 7/32* | (2017.01) |

(Continued)

(52) U.S. Cl.
CPC ............ *G06T 11/60* (2013.01); *G06K 9/0063* (2013.01); *G06K 9/42* (2013.01); *G06K 9/4604* (2013.01); *G06K 9/4642* (2013.01); *G06K 9/6202* (2013.01); *G06T 5/002* (2013.01); *G06T 5/003* (2013.01); *G06T 5/20* (2013.01); *G06T 7/11* (2017.01); *G06T 7/136* (2017.01); *G06T 7/32* (2017.01); *G06T 2207/10004* (2013.01); *G06T 2207/10032* (2013.01); *G06T 2207/20021* (2013.01); *G06T 2207/20032* (2013.01); *G06T 2207/20132* (2013.01); *G06T 2207/20221* (2013.01)

(58) Field of Classification Search
CPC . G06T 11/60; G06T 7/136; G06T 7/32; G06T 7/11; G06T 3/4038; G06T 5/002; G06T 5/003; G06T 5/20; G06T 2207/10004; G06T 2207/10032; G06K 9/0063; G06K 9/42; G06K 9/4604; G06K 9/4642; G06K 9/6202

USPC ......................................... 382/201, 282, 284
See application file for complete search history.

(56) References Cited

U.S. PATENT DOCUMENTS 6,393,162 B1 * 5/2002 Higurashi ............... G06T 5/006
345/629
8,554,014 B2 * 10/2013 Levy ..................... G06T 3/4038
382/107

OTHER PUBLICATIONS

Antony, et al. "Satellite Image Registration and Image Stitching", pp. 1-5, SCT College of Engineering, Feb. 2013.*

(Continued)

*Primary Examiner* — Daniel Mariam
(74) *Attorney, Agent, or Firm* — Eagle IP Limited; Jacqueline C. Lui

(57) ABSTRACT

A computer system that execute a method to stitch satellite images into a wide-angle image. The method includes dividing each of the satellite images into plural subimages, determining whether the subimages include an overlap area that overlaps with adjacent subimages, obtaining cropped subimages by removing the overlap area from the subimages, generating preprocessed satellite images each including the cropped subimages, selecting a reference image and a target image from the preprocessed satellite images, determining plural correspondent pairs in an overlap region between the reference and target images based on a feature matching algorithm, obtaining a transformation matrix by a least-squares algorithm and based on coordinates of the correspondent pairs, obtaining calibrated coordinates for each pixel of the target image by applying the transformation matrix, and stitching the target images into the wide-angle image based on the calibrated coordinates of the target image.

20 Claims, 8 Drawing Sheets

(51) Int. Cl.
G06T 5/00 (2006.01)
G06T 5/20 (2006.01)
G06K 9/00 (2006.01)
G06K 9/42 (2006.01)
G06K 9/62 (2006.01)

(56) References Cited

OTHER PUBLICATIONS

Zaragoza, J., Chin, T. J., Tran, Q.H., Brown, M. S., Suter, D, 2014. As-projective-as-possible image stitching with moving DLT. IEEE Transactions on Pattern Analysis and Machine Intelligence, 36(7), 1285-1298.
Song, T., Jeon, C., Ko, H., 2015. Image stitching using chaos-inspired dissimilarity measure. Electronics Letters, 51(3), 232-234.
Huang, C. M., Lin, S. W., Chen, J. H., 2015. Efficient Image Stitching of Continuous Image Sequence With Image and Seam Selections. IEEE Sensors Journal, 15(10), 5910-5918.
Archinal, B.A., Rosiek, M.R., Kirk, R.L., et al., 2006. Completion of the Unified Lunar Control Network 2005 and topographic model. In: Proceedings of 37th Lunar and Planetary Science XXXVII, 2310.
Barbara Zitova, Jan Flusser, 2003. Image registration methods: a survey. Image and Vision Computing, (21): 977-1000.
Dunkin, S.K., Heather, D.J., 2000. Remote sensing of the moon: the past, present and future. Proceedings of the Fourth International Conference on Exploration and Utilisation of the Moon: ICEUM-4. ESTEC, Noordwijk, the Netherlands. Jul. 10-14, 285-303.
Eliason, E., Isbell, C., Lee, E., et al., 1999. The Clementine UVVIS global lunar mosaic. Lunar and Planetary Institute, Houston.
Fonseca, L.M.G., Manjunath, B.S, Sep. 1996. Registration techniques for multisensor remotely sensed imagery. Photogrammetric Engineering & Remote Sensing, 62(9): 1049-1056.
Goswami, J.N., Annadurai, M., 2009. Chandrayaan-1: India's first planetary science mission to the moon. Current Sci., 96: 486-491.
Hansen, T.P., 1970. Guide to Lunar orbiter photographs: lunar orbiter photographs and maps missions 1 through 5. NASA SP-242, 254, N71-36179.
Harris C, Stephens M. A., 1988. combined corner and edge detector. Proceedings of the Fourth Alvey Conference, Manchester: University of Sheffield Printing Unit, 147-151.
Haruyama, J., Ohtake, M., Matsunaga, T., et al., 2008. Planned radiometrically calibrated and geometrically corrected products of lunar high-resolution terrain camera on SELENE. Advances in Space Research, (42): 310-316.
Haruyama, J., Hara, S., Hioki, K., Iwasaki, A., Morota, T., Othake, M., Matsunaga, T., et al., 2012. Lunar global digital terrain model dataset produced from SELENE (Kaguya) terrain camera stereo observations. In: Proceedings of 43rd the Lunar and Planetary Science Conference, Woodlands, TX. Mar. 19-23, 1200.
Kumar, A.S.K., Chowdhury, A.R., Banerjee, A., Dave, A.B., Sharma, B.N., Shah, K.J., Murali, K.R., Joshi, S.R., Sarkar, S.S., Patel, V.D., Feb. 2009. Terrain mapping camera: a stereoscopic high-resolution instrument on Chandrayaan-1. Currrent Sci, 96(4): 492-495.
LaBelle R.D., Garvey S.D., 1995. Introduction to high performance CCD cameras. Instrumentation in Aerospace Simulation Facilities, International Congress on. IEEE, 30/1-30/5.
Li Chunlai, Liu Jianjun, Ren Xin, et al., 2009. A new global image of the moon by Chinese Chang'E probe. In: Proceedings of 40th Lunar and Planetary Science Conference, 2568.
Li Chunlai, Liu Jianjun, Ren Xin, OuYang Ziyuan, et al., Aug. 2010. The global Image of the moon obtained by the Chang'E-1: data processing and lunar cartography. Science China: Earth Sciences, 53(8): 1091-1102.
Liu Jianjun, Ren Xin, Tan Xu, Li Chunlai, Feb. 2013. Lunar image data preprocessing and quality evaluation of CCD stereo camera on Cheng'E-2. Geometrics and Information Science of Wuhan University, 38(2): 186-190 (in Chinese).
Mengjie Ye, Jian Li, Yanyan Liang, Zhanchuan Cai, Zesheng Tang, Oct. 2011. Automatic seamless stitching method for CCD images of Chang'E-1 lunar mission. Journal of Earth Science, 22(5), 610-618.
Ouyang Ziyuan, Li Chunlai, Zou Yongliao, et al., 2010. Chang'E-1 lunar mission: an overview and primary science results. Chin. J. Space Sci., 30(5): 392-403.
Ouyang Ziyuan, Sep. 2010. Science results of Chang'e-1 lunar orbiter and mission goals of Chang'e-2. Spacecraft Engineering, 19(5): 1-6 (in Chinese).
Speyerer, E.J., Robinson, M.S., Denevi, B.W., the LROC Science Team, 2011. Lunar reconnaissance orbiter camera global morphological map of the moon. In: Proceedings of 42nd Lunar and Planetary Science Conference, 2387.
Scholten, F., Oberst, J., Matz, K.-D., Roatsch, T., et al., 2012. The near-global lunar 100 m raster DTM from LROC WAC stereo image Data. Journal of Geophysical Research, 117: 1-12.
Shuanggen Jin, Sundaram Arivazhagan, Hiroshi Araki, 2013. New results and questions of lunar exploration from SELENE, Chang'E-1, Chandrayaan-1 and LRO/LCROSS. Advances in Space Research, 52(2):285-305.
Wang Jingran, Chen Shengbo, Cui Tengfei, 2010. Mosaic of lunar image from CCD stereo camera onboard Chang'E-1 orbiter. Chin. J. Space Sci., 30(6): 584-588 (in Chinese).
Xue Bin, Zhao Baochang, Yang Jianfeng, Gao Wei, et al., Sep. 2011. Auto-compensation of velocity-height ratio for Chang'E-2 satellite CCD stereo camera. Science China: Technological Sciences, 54(9): 2243-2246.
Xia Jinchao, Ren Xin, Liu Jianjun, et al., Oct. 2011, Image coverage analysis of Chang'E-2. 4th International Congress on Image and Signal Processing, Shanghai, 15, 2066-2071.
Xinhua News Agency, Feb. 6, 2012. China released a high resolution global map of the moon. http://www.chinanews.com/gn/2012/02-06/3646635.shtml.
Xia Jinchao, Ren Xin, Liu Jianjun et al., Nov. 2012. Positioning of Lunar High-Precision Control Points on Chang'E-1/2 Original Images. Journal of Jilin University (Earth Science Edition), 42(Sup. 2): 460-468 (in Chinese).
Zhao Baochang, Yang Jianfeng, Wen Desheng, Gao Wei, Ruan Ping, He Yinghong, Jan. 2009. Design and on-orbit measurement of Chang'E-1 satellite CCD stereo camera. Spacecraft Engineering, 18(1): 30-36 (in Chinese).
Zhang Jixian, Deng Kazhong, Cheng Chunquan, Yan Qin, Ning Xiaogang, Guo Jian, 2010. Study on high-accuracy orientation with lunar remote sensing imagery. Journal of Remote Sensing, 14(3): 423-436.
Zhao Baochang, Yang Jianfeng, Wen Desheng, Gao Wei, Chang Lingying, Xue Bin, Jan. 2011. Chang'E-2 lunar orbiter CCD stereo camera design and validation. Spacecraft Engineering, 20(1), 14-21 (in Chinese).

* cited by examiner

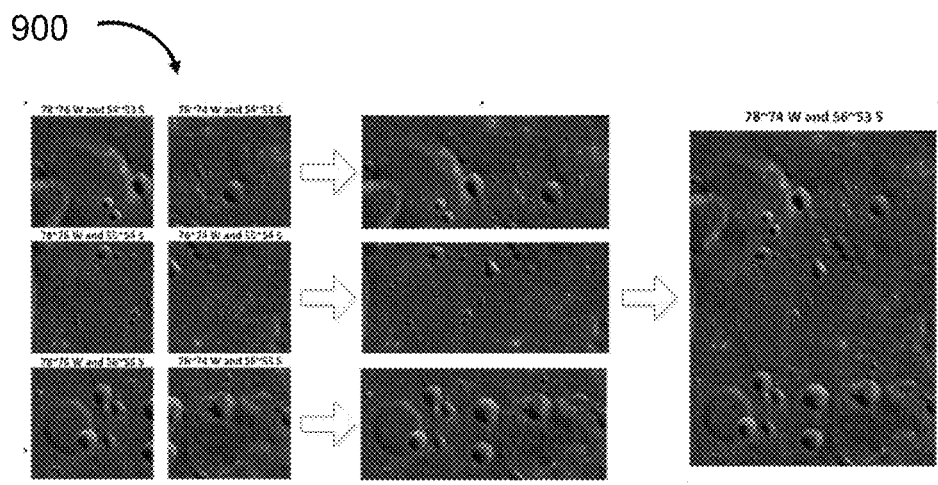
FIG. 9
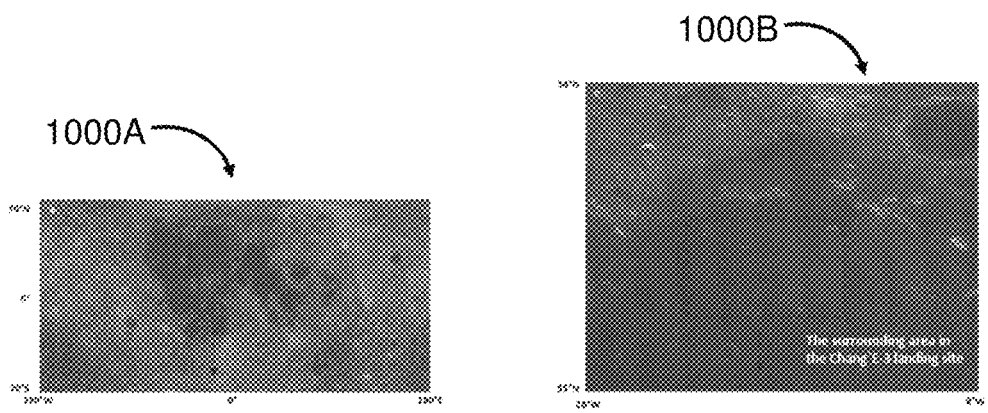
FIG. 10A
FIG. 10C
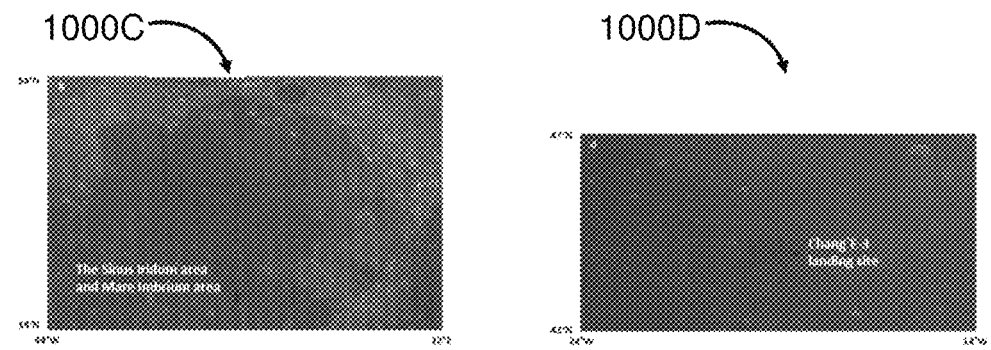
FIG. 10B
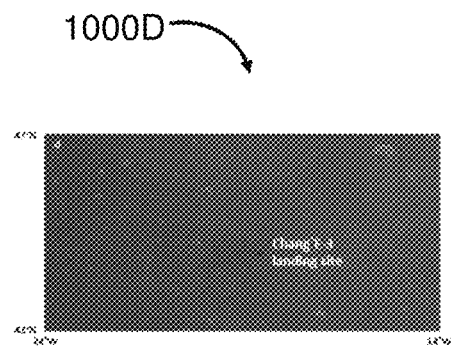
FIG. 10D

IMAGE STITCHING

FIELD OF THE INVENTION

The present invention relates to a method and system that process and stitch images.

BACKGROUND

Image stitching is a process that combines multiple images into a single view, such as a wide-angle view. Image stitching is process intensive which can lead to a large consumption of processing power, delays in processing time, and consumption of a large amount of memory.

New methods and apparatus that process and stitch large volumes of images will assist in advancing technological needs and solving technological problems.

SUMMARY OF THE INVENTION

One example embodiment is a method executed by a computer system that stitches satellite images into a wide-angle image. The method includes dividing each of the satellite images into plural subimages, determining whether the subimages include an overlap area that overlaps with adjacent subimages, obtaining cropped subimages by removing the overlap area from the subimages, generating preprocessed satellite images each including the cropped subimages, selecting a reference image and a target image from the preprocessed satellite images, determining plural correspondent pairs in an overlap region between the reference and target images based on a feature matching algorithm, obtaining a transformation matrix by a least-squares algorithm and based on coordinates of the correspondent pairs, obtaining calibrated coordinates for each pixel of the target image by applying the transformation matrix, and stitching the target images into the wide-angle image based on the calibrated coordinates of the target image.

Other example embodiments are discussed herein.

BRIEF DESCRIPTION OF THE DRAWINGS

FIG. 9 shows an image mergence process in accordance with an example embodiment.

FIG. 10A-FIG. 10D show images of the Moon in accordance with an example embodiment.

DETAILED DESCRIPTION

Figure 1:
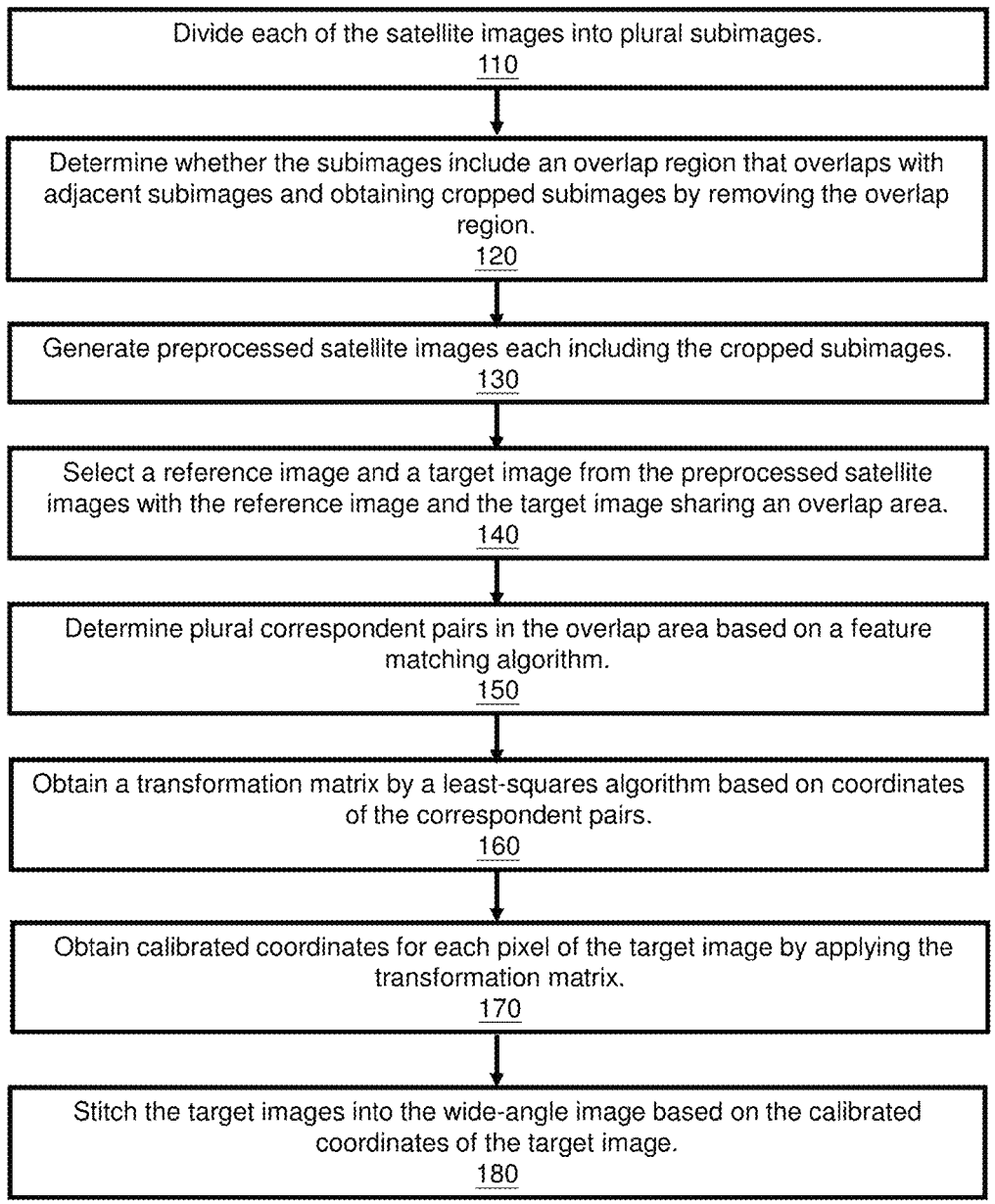
FIG. 1 shows a method that stitches satellite images into a wide-angle image in accordance with an example embodiment.

Example embodiments relate to a system and methods that process and stitch images into a wide-angle image.

By way of example, the traditional approach for drawing global lunar image suffers from computation inefficiency, high costs of human resources and low accuracy. For example, in the processing of mosaic image of Chang'e-1, the lunar map is divided into 6 mosaic areas, including 4 regions of low latitude, mid latitude, the South Pole and the North Pole. However the divided areas have no uniform geo-reference, causing difficulties in image stitching.

Example embodiments solve this problem and others while improving execution of the stitching process, reducing errors, and generating an improved image. For instance, a method of an example embodiment creates a single global map without relative position offset.

One example embodiment includes a stitching method for charge-coupled device (CCD) data from Chang'e-2 lunar mission. The stitching method produces a lunar map from 70° N to 70° S that covers 77.8% of the Moon with a spatial resolution of less than 10 m. The stitching method accelerates and improves the process and minimizes the utilization of human. The stitching method further calibrates location coordinates to achieve higher positioning accuracy.

As an example, the original images are taken by a CCD camera. The CCD camera of Chang'e-2 satellite and Chang'e-2 satellite utilizes the Time Delay and Integration (TDI) principle to capture digital images in push-broom mode, which simultaneously produces two kinds of high resolution (better than 10 m per-pixel and better than 1.5 m per-pixel) images with two viewing directions (forward 8° and backward 17.2°). The TDI CCD imaging method increases the detection sensitivity by lengthening the time staring at ground pixel and has been widely employed in the exploration of Earth and Mars. When the TDI CCD imaging condition is not satisfied, the modulation transfer function (MTF) along track direction, which represents the image quality, will be decreased.

The relative positioning precision is compared with the resolution of the images. For example, the relative positioning precision of Chang'e-1 CCD image range from 53~647 m to 1041~1273 m, which is 4~10 pixels. The relative positioning precision of Chang'e-2 CCD image ranges from 0.411 m to 2667.59 m, the offset of most pixels is less than 400 m, which means that the relative error of two corresponding pairs may arrive 60 pixels.

Chang'e-2 CCD stereo camera produces 608 tracks of CCD images in total, which include resolution better than 1.5 m at the orbit altitude of 15 km and better than 10 m at the orbit altitude of 100 km, respectively. The original data was preprocessed and provided by the Ground Segment for Data, Science and Application (GSDSA). Since regions with higher latitudes bring more overlapping, the payload (CCD stereo camera) of the satellite was shut down in latitude out of [−60°, 60°] in the even orbits and kept on in the latitude of [−90°, 90°] in the odd orbits.

After the processing procedure of radiometric calibration, geometric correction, and photometric correction etc., 2C level CCD data are produced and documented as standard Planetary Data System (PDS) format. PDS is the basic standard of planetary exploration data. There are six levels of data: raw data, 0 level, 1 level, 2 level, 2B level and 2C level data.

By way of example, 376 tracks of 2C level CCD image data are processed (≈2795 GB size in total). The resolution of the CCD stereo camera is less than 10 m/pixel. The relative coordinates of the adjacent tracks of Chang'e-2 CCD images have errors. After analyzing the corresponding pairs' locations of the CCD images, the average relative coordinate error is ~187.69 m, in which the maximum error is 2667.59 m and the minimum error is 0.411 m. Around 94% of location errors are less than 400 m and 6% location errors are more than 400 m.

One example embodiment includes a method for automatic stitching of CCD images from Chang'e-2 lunar mission. The method applies database technology and CCD positioning data. Database technology is employed to reorganize CCD images in order to access and retrieve a large volume of CCD images and data. The CCD positioning data is calibrated to decrease the relative positioning error.

One example embodiment includes methods and systems that process and stitch images of a large geographical surface or planet, such as the Moon, and provide an improvement over prior systems and methods to stitch images. The computer system executes an image stitching method to process and stitch the digital images in 2C level CCD data format obtained from Chang'e-2 lunar mission. The CCD camera is a payload on the lunar satellite to obtain digital images. Combing with the image registration technique and the characteristic of Chang'e CCD images, the method not only overcomes the contradiction of the high spatial resolution of the CCD images and the low positioning accuracy of the location coordinates, but also speeds up the processing and minimizes the utilization of human resources to produce lunar mosaic maps. A new lunar map from 70° N to 70° S with spatial resolution of less than 10 m is obtained by the method. Its average relative location accuracy of the adjacent orbits CCD image data is less than 3 pixels.

One example embodiment includes a system and methods that stitch satellite images into a wide-angle image and provide an improvement over prior systems and methods to stich images. The satellite images are divided into plural subimages that are cropped to remove overlap areas. Preprocessed satellite images are generated based on cropped subimages. A reference image and a target image are selected from the preprocessed satellite images and plural correspondent pairs in an overlap region between the reference and target images are identified. A transformation matrix is obtained by a least-squares algorithm based on coordinates of the correspondent pairs such that coordinates for each pixel of the target image are calibrated by applying the transformation matrix. A wide-angle image is obtained by stitching the target images based on the calibrated coordinates of the target image.

FIG. 1 shows a method that stitches satellite images into a wide-angle image.

Block 110 states divide each of the satellite images into plural subimages.

As one example, raw CCD images are acquired by a push-broom method and take the form of a long strip. Every long strip of CCD image is about 8.9 GB with 800,000 rows. In 2C level CCD data, every long strip of the CCD image and its related data (positioning grid data) are cut into 14 subimages from 90° N to 90° S in the odd orbit and to 10 subimages from 60° N to 60° S in the even orbit.

In one example embodiment, the images have a longitude coordinate ($x_i$) and a latitude coordinate ($y_i$) that are calculated by linear interpolation:

$$x_i = x_a + \frac{(x_b - x_a)(i-1)}{\Delta s - 1}$$

$$y_i = x_a + \frac{(y_b - y_a)(i-1)}{\Delta s - 1},$$

where i=1, 2, ..., $\Delta s$, 1≤$\Delta s$≤n, $x_a$, $x_b$, $y_a$, $y_b$ are coordinates of reference pixels, and $\Delta s$ is a number of interpolation pixels.

By way of example, the Chang'e-2 2C level CCD data include CCD images and its related data, such as location data, time, and instrument angle data of satellite. Each row of image contains 6144 pixels. In order to save computing source, only 9 location data of pixels in one row are given explicitly. One coordinate point for each 768 pixels in the interval from 1st to 6144th is given. In each column of image, the location data are also given in the same way as in each row, but the number of rows is not fixed and changeable in different image. Since there is a coordinate point for each 768 pixels in the interval of every row/column of the Chang'e-2 CCD image, $\Delta s$ is set to 768 in this example.

Block 120 states determine whether the subimages include an overlap area that overlaps with adjacent subimages and obtaining cropped subimages by removing the overlap area.

By way of example, overlap area between adjacent subimages is different in brightness after photometric calibration. A method of Sum of Squared Difference (SSD) is executed to determine the overlap areas. The SSD matching method is represented by:

$$d(u,v)=\Sigma_{x,y}(f(x,y)-t(x-u,y-v))^2,$$

where $f$ is an intensity value of a pixel located at position (x, y), t is an intensity value of a template pixel located at position (x−u, y−v), and d(u, v) is an overlap factor. The overlap area is determined by whether the overlap factor is less than a predetermined threshold. SSD can be viewed as the squared Euclidean distance. The smaller the overlap factor is, the more similar the image and the template are. If the overlap factor value is 0, the image and the template completely overlap with each other.

Block 130 states generate preprocessed satellite images each including the cropped subimages.

By way of example, every satellite image of the Moon is divided into 14 subimages from 90° N to 90° S in the odd orbit and to 10 subimages from 60° N to 60° S in the even orbit, respectively. After cropping the overlap areas in each subimage, the subimages are merged based on positioning grid data to obtain preprocessed satellite images.

Block 140 states select a reference image and a target image from the preprocessed satellite images with the reference image and the target image sharing an overlap region.

By way of example, a preprocessed image that includes more location points is selected as a reference image. For example, satellite image of the Moon covers from 90° N to 90° S in the odd orbit and from 60° N to 60° S in the even orbit. Since the latitude range of odd-orbit images is larger than the even-orbit images, the odd-orbit images are selected as reference images and the even-orbit images are selected as target images.

Block 150 states determine plural correspondent pairs in the overlap region based on a feature matching algorithm.

By way of example, feature points are detected in the overlap region. Before the feature point detection, in order to keep the image details clearly and reduce the interference of noise, initial CCD images are expanded one level scale-space (1 time scale) and applied median filtering operation for de-noising. In addition, in order to obtain dense feature points with even distribution, reference images for recovery of original (reducing one level scale-space) size is enhanced and the edges of the reference images are sharpened by a Canny operator.

Feature points of the reference image are extracted by a Harris detector. By way of example, the feature points are identified and extracted based on plural conditions, such as a corner response and local maximal values. The Harris detector is represented by:

$$R = \det(M) - k \cdot tr(M)^2$$
$$\det(M) = \alpha \cdot \beta = AB - C^2$$
$$tr(M) = \alpha + \beta = A + B$$
$$M = \begin{bmatrix} A & C \\ C & B \end{bmatrix}$$
$$A = X^2 \otimes W$$
$$B = Y^2 \otimes W$$
$$C = (XY) \otimes W$$
$$W = \exp\left(-\frac{u^2 + v^2}{2\sigma^2}\right)$$
$$X = I \otimes (-1, 0, 1) \approx \frac{\partial I}{\partial x}$$
$$Y = I \otimes (-1, 0, 1)^T \approx \frac{\partial I}{\partial y},$$

where R is a corner response that measures whether a point is a corner point by determining whether the corner response is more than a threshold, M is a 2×2 symmetric matrix made of A, B and C, det(M) is a determinant of the matrix M, tr(M) is a trace of the matrix M, k is a predetermined number, α and β are eigenvalues of M, W is a Gaussian window, σ is a standard deviation of the Gaussian window, u and v are coordinates of pixels in the overlap region, X is the first gradient along the x direction of image I, and Y is the first gradient along the y direction of image I. As one example, the value of k is in a range of 0.04~0.06 and the size of the Gaussian window is 5×5 with a σ value of 2.

By way of example, feature points are further evaluated based on a feature matching algorithm. The overlap region between the reference image and the target image is obtained by a normalized cross-correlation method that determines the overlap region based on whether a correlation coefficient is more than a predetermined number. The normalized cross-correlation method performs feature points matching process by roughly matching, area-based registration and eliminating the false correspondent pairs by RANSAC method. The correlation coefficient measures similarity between two windows on an absolute scale ranging from [−1, 1]. Each template in the reference image is compared to every subimage in the target image to find the best match. The center points in the reference and target images are the control points or correspondent pairs.

Block 160 states obtain a transformation matrix by a least-squares algorithm based on coordinates of the correspondent pairs.

By way of example, adjacent tracks of images suffer from geometric deformation. A transformation matrix, such as a two-dimensional affine transformation, corrects the geometric deformation. The transformation matrix consists of the scaling, translation, rotation and shearing factors. Since the last row of the affine matrix is ([0, 0, 1]), it has six degree ($m_1$, $m_2$, $m_3$, $m_4$, $t_x$, $t_y$) of freedom. The matrix form of affine transformation as follows:

$$\begin{bmatrix} u \\ v \\ 1 \end{bmatrix} = \begin{pmatrix} m_1 & m_2 & t_x \\ m_3 & m_4 & t_y \\ 0 & 0 & 1 \end{pmatrix} \begin{bmatrix} x \\ y \\ 1 \end{bmatrix},$$

where m1, m2, m3, m4, $t_x$, and $t_y$ are parameters of the transformation matrix. When there are n correspondent pairs ($u_{1\sim n}$, $v_{1\sim n}$) and ($x_{1\sim n}$, $y_{1\sim n}$), the transformation matrix can be written as:

$$\begin{bmatrix} x_1 & y_1 & 0 & 0 & 1 & 0 \\ 0 & 0 & x_1 & y_1 & 0 & 1 \\ . & . & . & . & . & . \\ . & . & . & . & . & . \\ x_n & y_n & 0 & 0 & 1 & 0 \\ 0 & 0 & x_n & y_n & 0 & 1 \end{bmatrix} \begin{bmatrix} m_1 \\ m_2 \\ m_3 \\ m_4 \\ t_x \\ t_y \end{bmatrix} = \begin{bmatrix} u_1 \\ v_1 \\ . \\ . \\ u_n \\ v_n \end{bmatrix},$$

which can be rewritten as:

AR=B, where A, R, and B are the three parts of formula in which R the transformation matrix.

Utilizing longitude and latitude coordinates of correspondent feature point pairs, the transformation matrix is computed by means of the least square represented by:

$$\min_{m1, m2, m3, m4, t_x, t_y} \left\| \begin{bmatrix} x_1 & y_1 & 0 & 0 & 1 & 0 \\ 0 & 0 & x_1 & y_1 & 0 & 1 \\ . & . & . & . & . & . \\ . & . & . & . & . & . \\ x_n & y_n & 0 & 0 & 1 & 0 \\ 0 & 0 & x_n & y_n & 0 & 1 \end{bmatrix} \begin{bmatrix} m_1 \\ m_2 \\ m_3 \\ m_4 \\ t_x \\ t_y \end{bmatrix} - \begin{bmatrix} u_1 \\ v_1 \\ . \\ . \\ u_n \\ v_n \end{bmatrix} \right\| =$$

$$\min_R \|AR - B\|_2$$

$$R = A^{-1} B$$

Block 170 states obtain calibrated coordinates for each pixel of the target image by applying the transformation matrix.

By way of example, the coordinates for each pixel of the target image are calibrated by applying the transformation matrix. For example, the coordinates for each pixel of the target image are multiplied by the two-dimensional affine transformation matrix.

Block 180 states stitch the target images into the wide-angle image based on the calibrated coordinates of the target image.

By way of example, CCD image data are discretized and separately stored in a text file and every grid region is reconstructed into images from the discrete data sets. The sizes of reconstructed CCD images are calculated according to the pixel spatial resolution. For example, the swath width of CCD image of Chang'e-2 is about 43 km, with 6144 pixels in a row. The image resolution is estimated to be 43 km÷6144 pixel≈7 m/pixel, which is less than 10 m/pixel. The diameter of the Moon is about 3474.8 km and the length of the equator of the Moon is about 10911 km. As such, there are about 1,559,000 pixels around the equator each having a size of 0.00023°×0.00023°. Hence, the size of reconstruction CCD image of every grid region)(1°×2°) is set to 4330×8660 pixels to achieve the requirement of the original resolution of Chang'e-2.

In one example embodiment, the CCD images are reconstructed with each pixel placed by its unique coordinate under the certain resolution. The original resolution (about 7 m/pixel) of the reconstructed CCD image is large and the size of the reconstructed CCD image can be down-sampled. For example, the computation of new grayscale can be obtained through a median gray value.

For example, the original images with high resolution are reduced in resolution and merged based on coordinates to produce lunar map from 70° N to 70° S.

Figure 2:
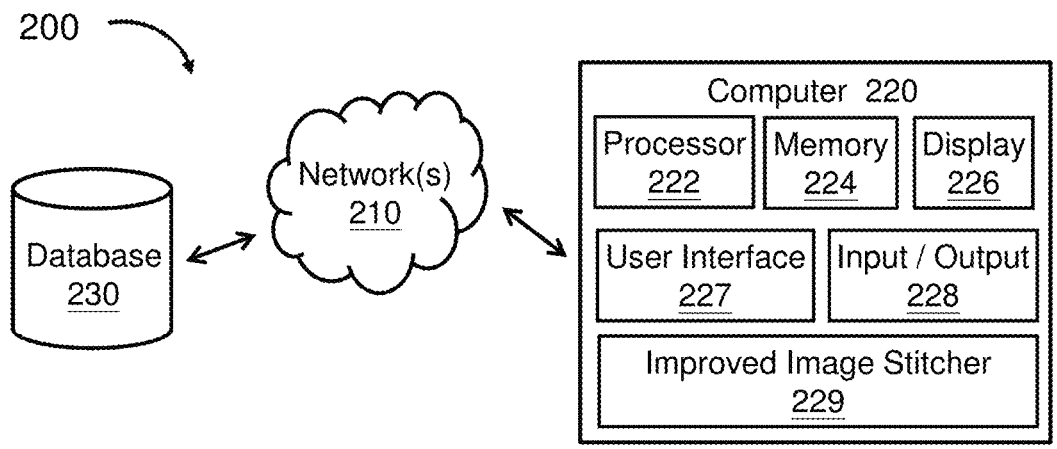
FIG. 2 shows a computer system in accordance with an example embodiment.

FIG. 2 shows a computer system 200 in accordance with an example embodiment. The computer system 200 includes a computer 220 and a database 230. The computer and the database communicates with each other through one or more networks 210.

The networks 210 include one or more of the internet, an intranet, an extranet, a cellular network, a local area network (LAN), a home area network (HAN), metropolitan area network (MAN), a wide area network (WAN), a Bluetooth network, public and private networks, etc.

The computer 220 includes a processor 222, a memory 224, a display 226, a user interface 227, an input/output (I/O) 228 and an improved image stitcher 229. As one example, the I/O 228 obtains image data from the database 230 through the networks 210. The memory 224 stores instructions for the processor 222 to execute. The processor processes the image data and displays the processed image on the display 226.

The improved image stitcher 229 is an example of specialized hardware and/or software that assists in improving performance of a computer and/or execution of methods discussed herein. The improved image stitcher processes the image data and displays the stitched image on the display 226. Example functions of the improved image stitcher are discussed in FIG.1.

In one example embodiment, the computer system obtains images from the database, divides the images into plural subimages, obtains cropped subimages by removing an overlap area that overlaps with adjacent images, generates prepressed images each including the cropped subimages, selects a reference image and a target image from the preprocessed images, determines plural correspondent pairs in an overlap region between the reference image and the target image based on a feature matching algorithm, obtains a transformation matrix by a least-squares algorithm based on coordinates of the correspondent pairs, obtains calibrated coordinates for each pixel of the target image by applying the transformation matrix, and stitches the target images into the wide-angle image based on the calibrated coordinates of the target image.

In one example embodiment, the computer system determines the overlap area by a Sum of Squared Difference (SSD) method represented by:

$$d(u,v)=\Sigma_{x,y}(f(x,y)-t(x-u,y-v))^2,$$

where $f$ is an intensity value of a pixel located at position (x, y), t is an intensity value of a template pixel located at position (x−u, y−v), and d(u, v) is an overlap factor. The overlap area is determined by whether the overlap factor is less than a predetermined threshold. SSD can be viewed as the squared Euclidean distance. The smaller the overlap factor is, the more similar the image and the template are.

In one example embodiment, the computer system selects a first preprocessed image from the preprocessed images as the reference image and a second preprocessed image from the preprocessed images as the reference image. The first preprocessed image has more pixels than the second preprocessed image. The processor calculates a correlation coefficient that measures similarity between a first window in the reference image and a second window in the target image and obtains the correspondent pairs. Each correspondent pair includes a first center point in the first window and a second center point in the second window.

The computer system maps each of the target images based on the calibrated coordinates to a template that includes plural partitions by a batch processing method to obtain a wide-angle image.

Figure 3:
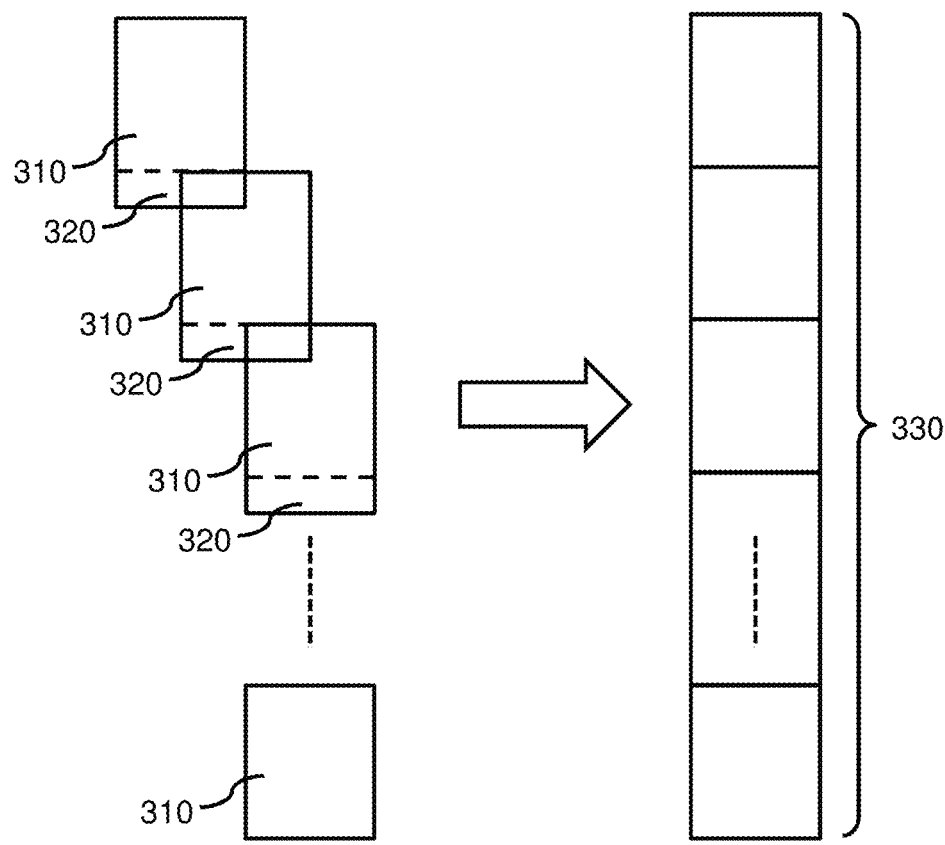
FIG. 3 shows a diagram block of an overlap cropping process in accordance with an example embodiment.

FIG. 3 shows a diagram block of an overlap cropping process in accordance with an example embodiment. Each image is divided into plural subimages 310. The overlap region 320 that overlaps with adjacent subimages is removed from the original subimages. The cropped subimages are merged to obtain a preprocessed image 330.

As one example, raw CCD images are acquired by a push-broom method and thus take the form of a long strip. Every long strip of CCD image is 8.9 GB big with 800,000 rows. Hence, every long strip of the CCD image and its related data (positioning grid data) are cut into 14 subimages from 90° N to 90° S in the odd orbit and to 10 subimages from 60° N to 60° S in the even orbit. The overlap region that overlaps with adjacent subimages is removed. The cropped subimages are then merged to obtain a preprocessed satellite image.

Figure 4A:
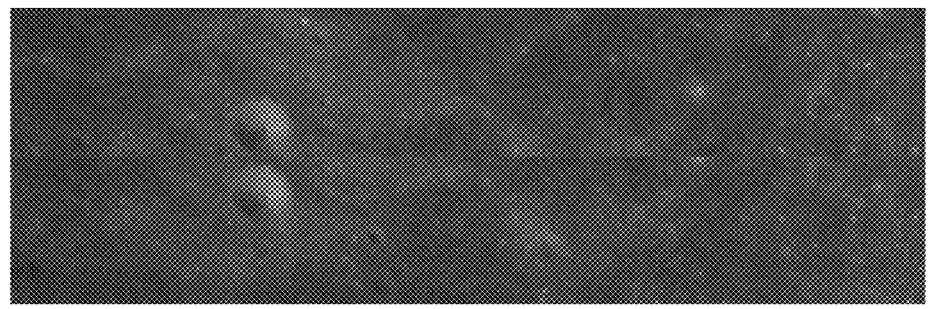
FIG. 4A shows an image without overlap cropping in accordance with an example embodiment.

FIG. 4A shows an image 400A without overlap cropping in accordance with an example embodiment.

Figure 4B:
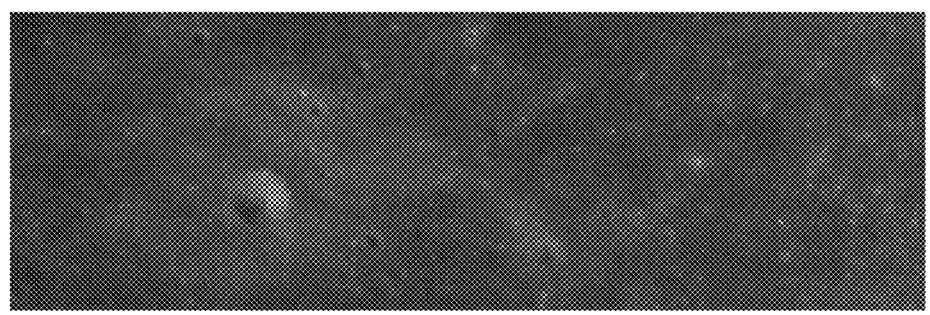
FIG. 4B shows an image with overlap cropping in accordance with an example embodiment.

FIG. 4B shows an image 400B with overlap cropping in accordance with an example embodiment.

By way of example, the overlap region shown in FIG. 4A is removed from the original subimages. The cropped subimages are merged to obtain a preprocessed image as shown in FIG. 4B.

Figure 5:
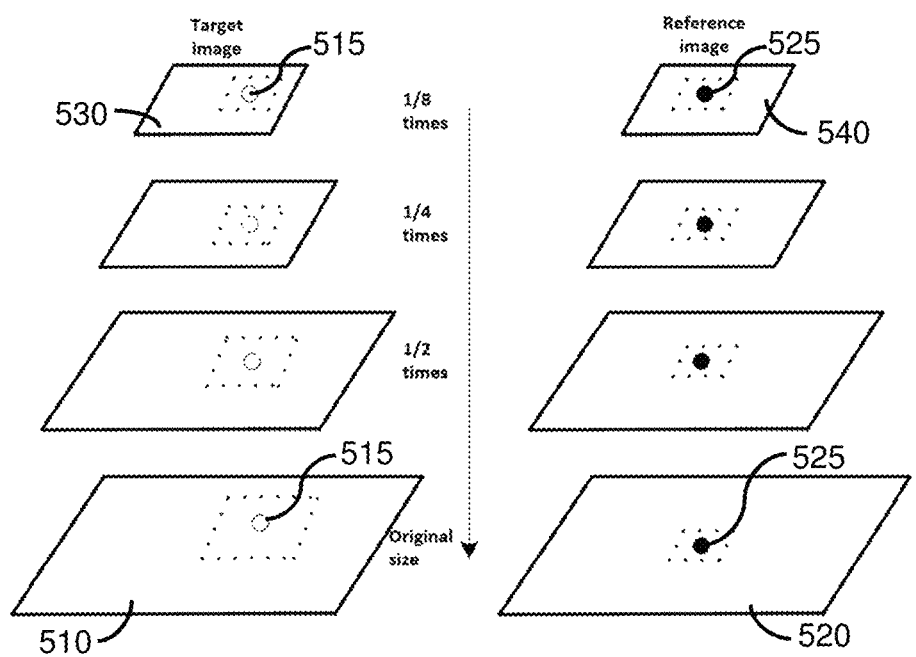
FIG. 5 shows a method of determining an overlap region in accordance with an example embodiment.

FIG. 5 shows a method of determining an overlap region in accordance with an example embodiment.

By way of example, the computer system determines a central point in the overlap region by a normalized cross-correlation method and a Gaussian pyramid method, selects feature points in the overlap region by an area-based registration method, and obtains plural correspondent pairs in the overlap region. Each of the correspondent pairs includes the reference location and the target location.

Firstly, the central points 515 and 525 of overlapped region are detected rapidly by a normalized cross correlation (NCC) approach and a Gaussian Pyramid method (4 layers), which save computational cost and speed up the procedure. Secondly, the overlapped region between the reference image and the target image is matched roughly. The target image 510 and the reference image 520 are down sampled by ⅛ times to obtain a down-sampled target image 530 and a down-sampled reference image 540. The approximate overlap region between the central region of the down-sampled target image 530 and the central region of the down-sampled reference image 540 is determined by the NCC registration method. Correspondingly, the registered subimage of target image is also determined. Lastly, the overlap region is determined between a central region in the reference image and subimages of the target image through 2 times expanding scale until the original size is resumed.

Figure 6:
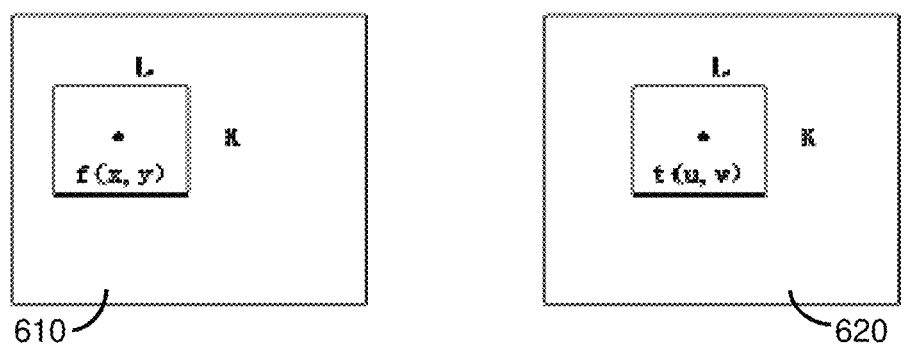
FIG. 6 shows an area-based registration method in accordance with an example embodiment.

FIG. 6 shows an area-based registration method in accordance with an example embodiment.

In one example embodiment, the computer system calculates a correlation coefficient that measures similarity between a first window in the reference image and a second window in the target image and obtains the correspondent pair each including a first center point in the first window and a second center point in the second window.

By way of example, a small template of points in the reference image 620 is statistically compared with windows of the same size in the target image 610.

The NCC approach is used for area-based registration of feature points. The normalized cross correlation is mathematically represented by:

$$\hat{f}(x, y) = \frac{f(x, y) - \bar{f}}{\sqrt[2]{\sum_{x,y}(f(x, y) - \bar{f})^2}}$$

$$\hat{t}(x, y) = \frac{t(x - u, y - v) - \bar{t}}{\sqrt[2]{\sum_{x,y}(t(x - u, y - v) - \bar{t})^2}}$$

$$C(u, v) = \sum_{x,y} \hat{f}(x, y)\hat{t}(x, y)$$

$$= \frac{\sum_{x,y}[(f(x, y) - \bar{f})(t(x - u, y - v) - \bar{t})]}{\sqrt[2]{\sum_{x,y}[(f(x, y) - \bar{f})^2]} \sqrt[2]{\sum_{x,y}[(t(x - u, y - v) - \bar{t})^2]}}$$

$$1 \le x \le K, 1 \le y \le L$$

where t denotes the K by L template of the reference image 720 (an M'×N' array), $f$ denotes the K by L subimage of the target image 710 (an M×N array), $\hat{t}(x-u, y-v)$ is the value of pixel in template t and $\bar{f}$ is the value of pixel in subimage $f$ by normalization, and $\bar{t}$ is the mean of the template and $\bar{f}$ is the mean of $f(x,y)$ in the region under the template.

The best match occurs when the value C(u, v) is maximum. The correlation coefficient measures similarity between two windows on an absolute scale ranging from [−1, 1]. Each template t in the reference image 620 is compared to every subimage $f$ in the target image 610. After finding the subimage $f$ that best matches t, the center points (u, v) and (x, y) are taken as the control points or correspondent pairs.

In an example embodiment, the correspondent pairs in the overlap region are established by area-based registration. However, lunar images are consisting of very similar, neighboring texture patterns. At last, RANSAC (Random Sample Consensus) algorithm is used to remove the false correspondent pairs. For example, the number of random trials for finding the outliers is 2500 times iteration. The Sampson distance type is used to determine whether a pair of points is an inlier or outlier and its distance threshold for finding outliers is 1.

As one example, image registration and Chang'e-2 CCD image characteristics are used to calibrate the relative longitude and latitude coordinates of image pixels to prepare the mosaic of lunar images.

Figure 7:
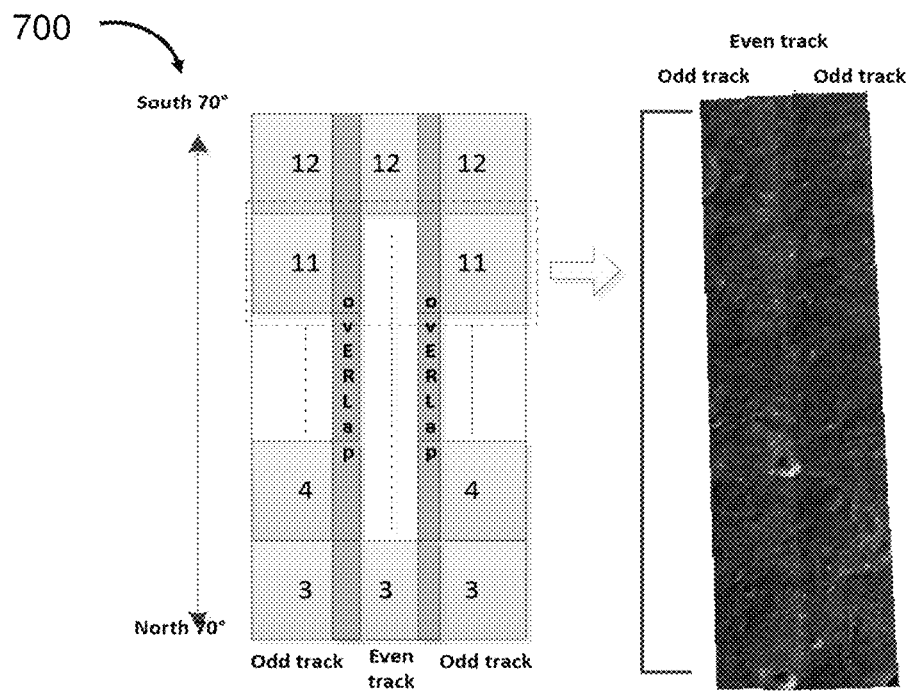
FIG. 7 shows a method of selecting data in accordance with an example embodiment.

FIG. 7 shows a method 700 of selecting data in accordance with an example embodiment. After the target image is calibrated, the new grayscale of the overlap region between target and reference CCD image is replaced by reference CCD data. This method reduces the data volume without sacrificing the image precision.

By way of example, pixels in conventional photographs are exposed simultaneously and measured by only one transformation matrix. There is a different set of the exterior orientation parameters for each scan line because each line of Chang'e-2 stereo images was acquired in a push-broom manner at a different instant of time. In order to get more feature points and accurate transformation matrixes, four CCD images from three adjacent tracks (odd track, even track and odd track) are selected for calibration of their location coordinates. Two CCD images of odd tracks are reference images, and two CCD images of the same even track are target images. As one example, the size of the images is 1200 rows×3072 columns. This selection method achieves higher computational efficiency, registration accuracy and feature points uniformity.

In one example embodiment, after calibration of the longitude and latitude coordinates, some errors may occur. The value of the errors, the precision, quantity and uniformity of the corresponding pairs are closely related. To minimize error, the number of corresponding pairs are sufficiently large with a wide distribution.

In one example embodiment, the CDD images cover one and a half lunar surface. The overlap appears on every adjacent tracks once.

In one example embodiment, all CCD images of the odd orbits are regarded as reference images because they coverage from 90° N to 90° S. All CCD images of the even orbits are regarded as target images with coverage from 60° N to 60° S. Since higher latitude brings enough overlapping, the middle orbit among every three orbits is treated as target in the latitude [−90°, −70°] and [70°, 90°]. But the intensity of CCD image of lunar poles (in the latitude of [−90°, −70°] and [70°, 90°]) is too low for calibration. Therefore, the lunar map in the latitude of [−70°, 70°] is produced.

Figure 8:
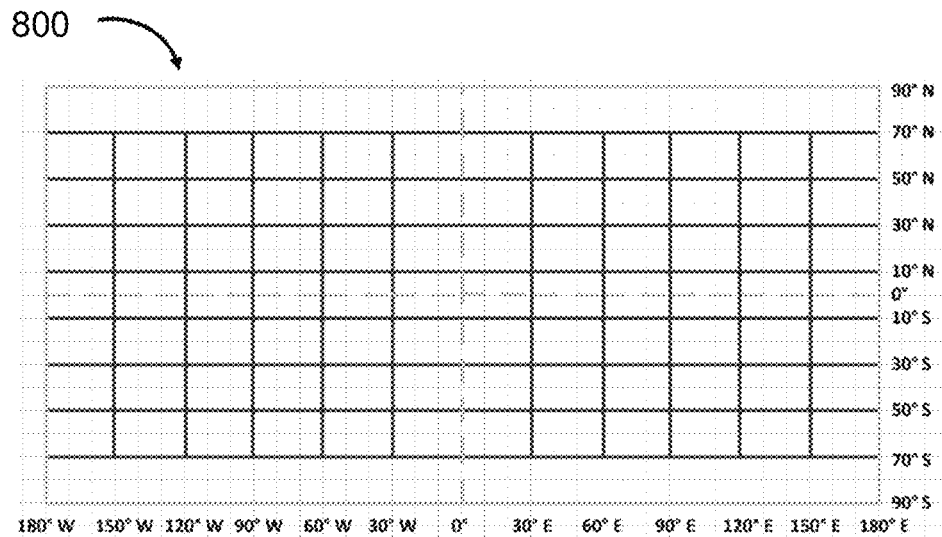
FIG. 8 shows a template that includes plural partitions in accordance with an example embodiment.

FIG. 8 shows a template 800 that includes plural partitions in accordance with an example embodiment.

By way of example, the massive CCD data consume a lot of computer memory and hard disk. To facilitate management and preservation of CCD data, database techniques are used to store and reorganize the image data. As the data table format of database, a data table consists of three fields (longitude coordinate, latitude coordinate and gray level of pixel). The data sets are stored in the text file in binary format. CCD data are stored in different sub tables instead of in a single table.

As one example, the lunar oblateness is 0.0002 and can be treated as a sphere. The lunar plane in the latitude of [−70°, 70°] is divided into 180×140=25200 quads with a size of 1°×2° according to the longitude and latitude degree after Mercator projecting (shown in FIG. 8). The CCD data are imported into and stored in different quads corresponding to the coordinates by batch processing techniques. The average number of records in every sub table is more than 100 million. In general, the size of quads is adjustable based on the computer performance.

FIG. 9 shows an image mergence process 900 in accordance with an example embodiment. All subimages are merged based on their coordinates. A lunar map from 70° N to 70° S is obtained by the mergence process.

FIG. 10A-FIG. 10D show images of the Moon after the image stitching process in accordance with an example embodiment.

FIG. 10A shows the lunar surface map 1000A from 70° N to 70° S with high spatial resolution of less than 10 m. Three-fourth global mosaics are constructed at full and reduced spatial resolution (1/32 times down-resampling) to display. FIG. 10B shows an image 1000B of Sinus Iridum area and Mare Imbrium area of Moon (1/8 times down-resampling). FIG. 10C shows an image 1000C of the surrounding area in the Chang'e-3 landing site of the Mare Imbrium area (1/2 times down-resampling). FIG. 10D shows an image 1000D of the Chang'e-3 landing site (full spatial resolution).

Figure 11A:
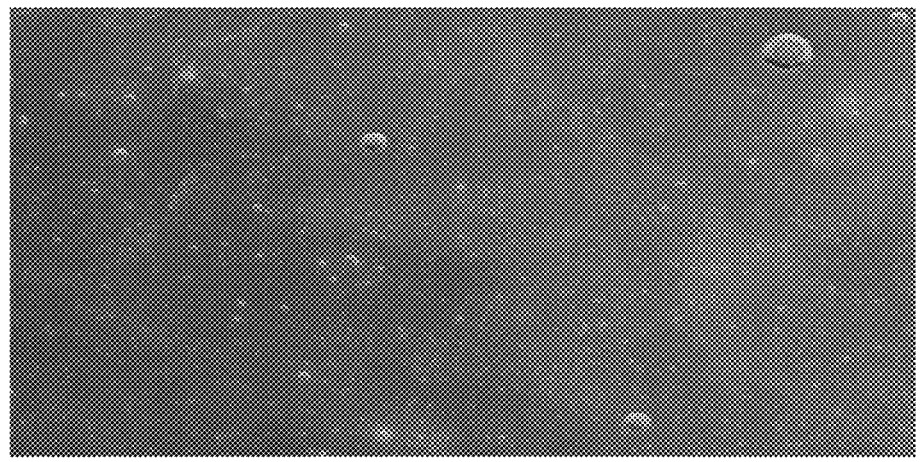
FIG. 11A shows a stitched image of the Moon published by Chinese Lunar Exploration Program.

FIG. 11A shows a stitched image 1100A of the Moon published by Chinese Lunar Exploration Program.

Figure 11B:
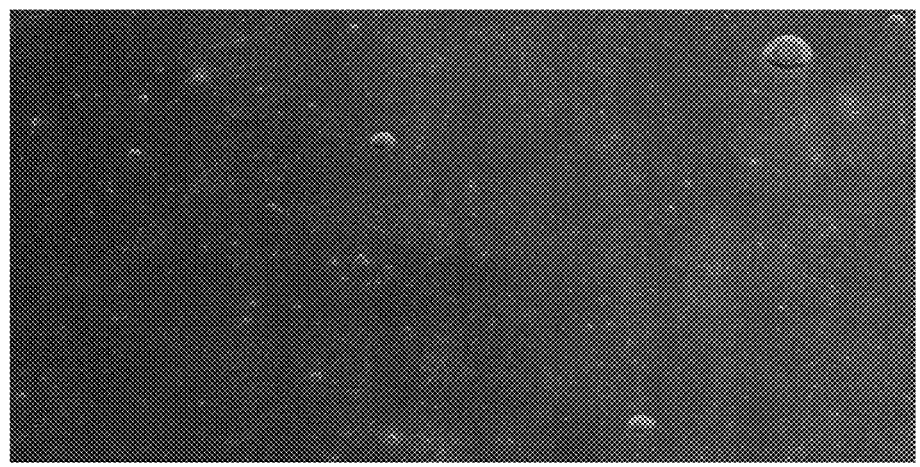
FIG. 11B shows a stitched image of the Moon in accordance with an example embodiment.

FIG. 11B shows a stitched image 1100B of the Moon in accordance with an example embodiment.

FIG. 11A and FIG. 11B compare the Moon image that is published by Chinese Lunar Exploration Program with a stitched image processed by one example embodiment. The two images are processed based on the same source (Chang'e-2 CCD images, about 7 m resolution). The two mosaic effects are similar.

Figure 12:
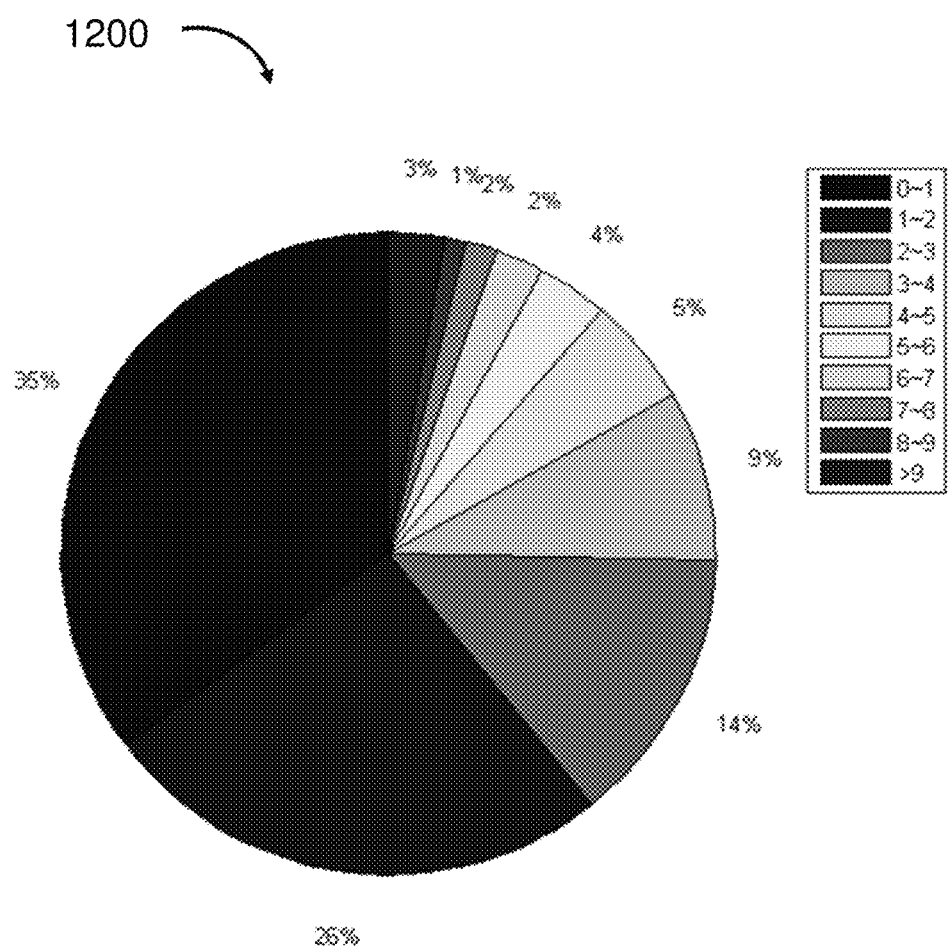
FIG. 12 shows a pie chart that shows accuracy of corresponding pairs in accordance with an example embodiment.

FIG. 12 shows a pie chart 1200 that shows accuracy of corresponding pairs in accordance with an example embodiment. It shows the accuracy by the pie chart. In the figure, there are 89% corresponding pairs in 0~5 pixel difference in total. The accuracy of most corresponding pairs is controlled under 0~1 pixels. Its average relative location accuracy of the adjacent orbits CCD image data is less than 3 pixels By way of example, FIG. 12 shows the user with an estimate of how accurate the mosaic is. An evaluation of quantitative statistics analysis about the registration accuracy is provided. One example method for measuring the registration accuracy is alignment error measure. The Euclid distance between the corresponding pairs are calibrated as the errors evaluation.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed by a software application, an electronic device, a program, a computer, firmware, hardware, a process, and/or a computer system. Furthermore, blocks and/or methods discussed herein can be executed automatically with or without instruction from a user.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

What is claimed is:

1. A method executed by a computer system that stitches satellite images into a wide-angle image, the method comprising:
    dividing, by the computer system, each of the satellite images into plural subimages;
    determining, by the computer system, whether the subimages include an overlap area that overlaps with adjacent subimages;
    obtaining, by the computer system, cropped subimages by removing the overlap area from the subimages;
    generating, by the computer system, preprocessed satellite images each including the cropped subimages;
    selecting, by the computer system, a reference image and a target image from the preprocessed satellite images, the reference image and the target image sharing an overlap region;
    determining, by the computer system and based on a feature matching algorithm, plural correspondent pairs in the overlap region, each of the correspondent pairs including a reference location in the reference image and a target location in the target image;
    obtaining, by the computer system and based on coordinates of the correspondent pairs, a transformation matrix by a least-squares algorithm;
    obtaining, by the computer system, calibrated coordinates for each pixel of the target image by applying the transformation matrix;
    stitching, by the computer system and based on the calibrated coordinates of the target image, the target images into the wide-angle image.

2. The method of claim 1, wherein each of the satellite images has a longitude coordinate ($x_i$) and a latitude coordinate ($y_i$) that are calculated by linear interpolation:

$$x_i = x_a + \frac{(x_b - x_a)(i - 1)}{\Delta s - 1}$$

$$y_i = x_a + \frac{(y_b - y_a)(i - 1)}{\Delta s - 1}$$

where i=1, 2, . . . , $\Delta s$, $1 \leq \Delta s \leq n$, $x_a$, $x_b$, $y_a$, $y_b$ are coordinates of reference pixels, and $\Delta s$ is a number of interpolation pixels.

3. The method of claim 1, wherein the overlap area is determined by a Sum of Squared Difference (SSD) method represented by:

$$d(u,v) = \Sigma_{x,y}(f(x,y) - t(x-u, y-v))^2$$

where $f$ is an intensity value of a pixel located at position (x, y), t is an intensity value of a template pixel located at position (x−u, y−v), and d(u, v) is an overlap factor, wherein the overlap area is determined by whether the overlap factor is less than a predetermined threshold.

4. The method of claim 1, wherein the feature matching algorithm including:

determining a central point in the overlap region by a normalized cross-correlation method and a Gaussian pyramid method;

selecting feature points in the overlap region by an area-based registration method; and obtaining plural correspondent pairs in the overlap region, each of the correspondent pairs including the reference location and the target location.

5. The method of claim 1, further comprising:

denoising the preprocessed satellite images by a median filtering operation; and sharpening edges of the reference image.

6. The method of claim 1, further comprising:

detecting feature points in the overlap region between the reference image and the target image by a detector represented by:

$$R = det(M) - k \cdot tr(M)^2$$

$$det(M) = \alpha \cdot \beta = AB - C^2$$

$$tr(M) = \alpha + \beta = A - B$$

where R is a corner response that measures whether a point is a corner point by determining whether the corner response is more than a threshold, where M is a matrix made of A, B and C, det(M) is a determinant of the matrix M, tr(M) is a trace of the matrix M, k is a predetermined number, α and β are eigenvalues of M.

7. The method of claim 1, further comprising:

detecting feature points in the overlap region between the reference image and the target image by:

$$M = \begin{bmatrix} A & C \\ C & B \end{bmatrix}$$

$$A = X^2 \otimes W$$

$$B = Y^2 \otimes W$$

$$C = (XY) \otimes W$$

$$W = \exp\left(-\frac{u^2 + v^2}{2\sigma^2}\right)$$

where M is a 2×2 symmetric matrix made of A, B and C, W is a Gaussian window, σ is a standard deviation of the Gaussian window, and u and v are coordinates of pixels in the overlap region.

8. The method of claim 1, wherein the overlap region between the reference image and the target image is obtained by a normalized cross-correlation method that determines the overlap region based on whether a correlation coefficient is more than a predetermined number.

9. A computer system, comprising:

a database that communicates with the server and stores pixel values of the images; and a processor that communicates with the database to obtain images, divides the images into plural subimages, obtains cropped subimages by removing an overlap area that overlaps with adjacent images, generates prepressed images each including the cropped subimages, selects a reference image and a target image from the preprocessed images, determines plural correspondent pairs in an overlap region between the reference image and the target image based on a feature matching algorithm, obtains a transformation matrix by a least-squares algorithm based on coordinates of the correspondent pairs, obtains calibrated coordinates for each pixel of the target image by applying the transformation matrix, and stitches the target images into the wide-angle image based on the calibrated coordinates of the target image.

10. The computer system of claim 9, wherein the processor determines the overlap area by a Sum of Squared Difference (SSD) method represented by:

$$d(u,v) = \Sigma_{x,y}(f(x,y) - t(x-u, y-v))^2$$

where $f$ is an intensity value of a pixel located at position (x, y), t is an intensity value of a template pixel located at position (x−u, y−v), and d(u, v) is an overlap factor, wherein the overlap area is determined by whether the overlap factor is less than a predetermined threshold.

11. The computer system of claim 9, wherein the processor calculates a correlation coefficient that measures similarity between a first window in the reference image and a second window in the target image and obtains the correspondent pairs each including a first center point in the first window and a second center point in the second window.

12. The computer system of claim 9, wherein the processor maps each of the target images based on the calibrated coordinates to a template that includes plural partitions by a batch processing method.

13. The computer system of claim 9, wherein the processor selects a first preprocessed image from the preprocessed images as the reference image and a second preprocessed image from the preprocessed images as the reference image, the first preprocessed image having more pixels than the second preprocessed image.

14. A method executed by a computer system that stitches images into a wide-angle image, the method comprising:

selecting, by the computer system, a reference image and a target image from a plurality of preprocessed images, the reference image and the target image sharing an overlap region;

determining, by the computer system, a central point in the overlap region by a normalized cross-correlation method and a Gaussian pyramid method;

selecting, by the computer system, feature points in the overlap region by an area-based registration method;

obtaining, by the computer system and based on the feature points, plural correspondent pairs in the overlap region, each of the correspondent pairs including a location in the reference image and a location in the target image;

obtaining, by the computer system and based on coordinates of the correspondent pairs, a transformation matrix by a least-squares algorithm;

obtaining, by the computer system, calibrated coordinates for each pixel of the target image by applying the transformation matrix;

stitching, by the computer system and based on the calibrated coordinates of the target image, the target images into the wide-angle image.

15. The method of claim 14, further comprising:

dividing each of the images into plural subimages;

determining whether the subimages can be cropped to remove an overlap area that overlaps with adjacent subimages;

obtaining a plurality of cropped subimages by removing the overlap area from the subimages;

generating a plurality of preprocessed images each including the cropped subimages.

16. The method of claim 15, wherein the overlap area is determined by a Sum of Squared Difference (SSD) method represented by:

$$d(u,v)=\Sigma_{x,y}(f(x,y)-t(x-u,y-v))^2$$

where $f$ is an intensity value of a pixel located at position (x, y), t is an intensity value of a template pixel located at position (x−u, y−v), and d(u, v) is an overlap factor, wherein the overlap area is determined by whether the overlap factor is less than a predetermined threshold.

17. The method of claim 14, further comprising:
calculating a correlation coefficient that measures similarity between a first window in the reference image and a second window in the target image; and
obtaining the correspondent pairs each including a first center point in the first window and a second center point in the second window.

18. The method of claim 14, further comprising:
removing false correspondent pairs in the overlap region by a Random Sample Consensus (RANSAC) algorithm.

19. The method of claim 14, further comprising:
mapping each of the target images to a template that includes plural partitions by a batch processing method.

20. The method of claim 14, wherein the images are CCD images of the Moon each having 6144 pixels from the north pole of the Moon to the south pole of the Moon.

* * * * *